(12) United States Patent
Horn et al.

(10) Patent No.: US 7,676,041 B2
(45) Date of Patent: Mar. 9, 2010

(54) METHOD FOR CREATING AND DISTRIBUTING CRYPTOGRAPHIC KEYS IN A MOBILE RADIO SYSTEM AND CORRESPONDING MOBILE RADIO SYSTEM

(75) Inventors: Günther Horn, München (DE); Dirk Kröselberg, München (DE)

(73) Assignee: Siemens Aktiengesellschaft, Munich (DE)

( * ) Notice: Subject to any disclaimer, the term of this patent is extended or adjusted under 35 U.S.C. 154(b) by 1216 days.

(21) Appl. No.: 10/546,252

(22) PCT Filed: Feb. 18, 2004

(86) PCT No.: PCT/EP2004/001549

§ 371 (c)(1),
(2), (4) Date: Aug. 19, 2005

(87) PCT Pub. No.: WO2004/075584

PCT Pub. Date: Sep. 2, 2004

(65) Prior Publication Data

US 2006/0171541 A1    Aug. 3, 2006

(30) Foreign Application Priority Data

Feb. 20, 2003  (DE)  ................ 103 07 403

(51) Int. Cl.
*H04L 9/08* (2006.01)
(52) U.S. Cl. ............... 380/278; 713/150; 713/171
(58) Field of Classification Search .......... None
See application file for complete search history.

(56) References Cited

U.S. PATENT DOCUMENTS

| 5,978,475 | A  | * | 11/1999 | Schneier et al. ............. 713/177 |
| 6,128,391 | A  |   | 10/2000 | Denno et al. |
| 6,233,703 | B1 |   | 5/2001  | Powers ........................ 714/48 |
| 6,526,509 | B1 | * | 2/2003  | Horn et al. .................. 713/171 |
| 6,876,747 | B1 | * | 4/2005  | Faccin et al. ................ 380/247 |
| 7,020,773 | B1 | * | 3/2006  | Otway et al. ................ 713/171 |
| 7,069,435 | B2 | * | 6/2006  | Sandhu et al. ............... 713/155 |
| 7,107,248 | B1 | * | 9/2006  | Asokan et al. ................ 705/67 |

(Continued)

FOREIGN PATENT DOCUMENTS

EP    1 075 123 A1    2/2001

(Continued)

OTHER PUBLICATIONS

G. Horn, D. Kröselberg, K. Müller: Security for IP multimedia services in the 3GPP third generation mobile system, Proceedings of the Third International Networking Conference INC'2002, Seiten 503 bis 512, Plymouth, UK, Jul. 16-18, 2002.

(Continued)

*Primary Examiner*—Ponnoreay Pich
(74) *Attorney, Agent, or Firm*—King & Spalding L.L.P.

(57) ABSTRACT

A first cryptographic key (318) and a second cryptographic key (322) are created by a mobile radio terminal (103) and by a computer of the home communications network (108, 109) by using authentication key materials (312). The first cryptographic key (318) is transmitted to the computer of the visited communications network (113), and the second cryptographic key (322) is transmitted to an application server computer (106, 107).

14 Claims, 3 Drawing Sheets

U.S. PATENT DOCUMENTS

| | | | |
|---|---|---|---|
| 7,149,895 B1 * | 12/2006 | Asokan et al. | 713/159 |
| 7,240,366 B2 * | 7/2007 | Buch et al. | 726/14 |
| 7,382,881 B2 * | 6/2008 | Uusitalo et al. | 380/262 |
| 7,389,412 B2 * | 6/2008 | Sharma et al. | 713/153 |
| 2002/0114469 A1 * | 8/2002 | Faccin et al. | 380/270 |
| 2003/0021416 A1 * | 1/2003 | Brown et al. | 380/277 |
| 2003/0031151 A1 | 2/2003 | Sharma et al. | |
| 2004/0158715 A1 * | 8/2004 | Peyravian et al. | 713/171 |

FOREIGN PATENT DOCUMENTS

| | | |
|---|---|---|
| EP | 1 156 694 | 11/2001 |
| EP | 1156694 A1 * | 11/2001 |
| EP | 1 209 934 | 5/2002 |
| EP | 1 213 943 | 6/2002 |
| EP | 1241826 A2 * | 9/2002 |
| WO | WO 9637064 A1 * | 11/1996 |
| WO | WO 99/00958 | 1/1999 |

OTHER PUBLICATIONS

IST-2000-25350—Shaman, D13—WP1 contribution, Final technical report comprising the complete technical results, specification and conclusion, Kapitel 4.7, Seiten 114 bis 122, Nov. 2002.

D. Harkins und D. Carrel, the Internet Key Exchange (IKE), RFC 2409, Seiten 17 bis 19, Nov. 1998.

\* cited by examiner

METHOD FOR CREATING AND DISTRIBUTING CRYPTOGRAPHIC KEYS IN A MOBILE RADIO SYSTEM AND CORRESPONDING MOBILE RADIO SYSTEM

CLAIM FOR PRIORITY

This application is national stage of PCT/EP 2004/001549 which was published on Sep. 2, 2004 and which claims the benefit of priority to German Application No. 103 07 403.1 filed Feb. 20, 2003. The contents of which are hereby incorporated by reference in their entirety.

TECHNICAL FIELD OF THE INVENTION

The invention relates to a system and method for creating and distributing cryptographic keys in a mobile radio system.

BACKGROUND OF THE INVENTION

As part of the Universal Mobile Telecommunications Systems (UMTS), Internet based multimedia services are developed in order to enhance the implementation capability of the UMTS mobile radio system and to extend the areas of application.

In the 3GPP (3rd Generation Partnership Project) a so-called IP-based Multimedia Subsystem (IMS), which is described in the UMTS Release 5—Architecture, was standardized as a platform for Internet based multimedia services for a mobile radio system.

If a mobile radio terminal of a mobile radio subscriber logs on in a communications network in a mobile radio system with IMS to make use of Internet based multimedia services, then an authentication procedure is carried out for the mobile radio terminal in accordance with the 3GPP standard described in 3GPP TS 33.203 V5.3.0—Technical Specification, 3rd Generation Partnership Project, Technical Specification
Group Services and System Aspects, 3G Security, Access security for IP-based services (Release 5) in accordance with the IMS Authentication and Key Agreement Protocol (IMS AKA Protocol).

In accordance with the IMS AKA Protocol, the mobile radio terminal and the communications network, in whose range the mobile radio terminal is currently sited, authenticate each other and two cryptographic keys are generated, the so-called integrity key and the so-called transfer key. In accordance with UMTS Release 5, to protect the IMS signaling the integrity key is used between the mobile radio terminal and a computer of the visited communications network (Visited Network). The computer of the visited communications network is set up as a Call State Control Function Computer (CSCF Computer) and is called a Proxy CSCF Computer (P-CSCF Computer). The transfer key is used for encryption, i.e. to protect the confidentiality of the data exchanged.

In addition to using the integrity keys to protect the IMS Signaling messages, it can be specified that when IP based services are to be provided, additional electronic messages are to be exchanged in a confidential manner between an application server computer and the mobile radio terminal.

In this description an application server computer on the network side is in particular a computer that offers services in accordance with a service provided on the application layer (OSI layer 7), preferably multimedia services, and that communicates in accordance with a layer 7 protocol, i.e. an application layer protocol. The application server computer can, for example, be equipped as an HTTP server computer (Hypertext Transfer Protocol) and can communicate with the mobile radio terminal in accordance with the HTTP protocol.

Over and above the basic functionality of the IMS, application server computers are for example, used for the administration of network side user settings and to store and manage profile data relating to the mobile radio system subscribers.

Some examples of such applications between mobile users (in particular those using an IMS mobile radio system) and application server computers in the communications network, who use the HTTP protocol, are:
- access lists on presence servers with which lists it is possible to use position information about the current position of a mobile radio terminal within the mobile radio system (for example, GPS data),
- buddy lists of chat applications, i.e. lists of authorized subscribers for a chat application,
- group management services and
- settings for electronic multimedia conferences As a further example for such an application, mention must be made of the fact that multicast connections between a mobile radio terminal and between a multicast service center are set up using the IMS system.

In order to secure the protocols used between the mobile radio terminal and the application server computer cryptographically, their messages must be protected, with respect to, for example, authentication, data integrity and/or data confidentiality.

Depending on the actual implementation scenario and the application layer protocol used, different security protocols are used to secure the application layer protocol, for example;
- for HTTP, the security protocol HTTP Digest, the TLS protocol (Transport Layer Security Protocol) or WTLS (Wireless Transport Layer Security Protocol) and
- for allocating keys for multicast communication links, MIKEY (Multimedia Internet KEYing).

With all cryptographic application layer protocols, the communication partners involved, in particular, the mobile radio terminal and the application server computer, i.e. the application server computer in the communications network, must have secret key material, i.e. secret keys, which material is available right from the start of the transmission of the first secured electronic message.

In the case of the IMS, the key infrastructure is based on symmetrical keys used to authenticate the IMS users as part of the IMS registration procedure, i.e. as part of the authentication and key exchange protocol described in 3GPP TS 33.203 V5.3.0—Technical Specification, 3rd Generation Partnership Project, Technical SpecificationGroup Services and System Aspects, 3G Security, Access security for IP-based services (Release 5).

As described in 3GPP TS 33.203 V5.3.0, a mobile radio terminal registers in the IMS for an IMS communication session at its home communications network (Home Network) at the computer designated for this purpose, which computer is also called the S-CSCF computer (Serving Call State Control Function Computer).

The communication takes place using a local proxy computer, the above described P-CSCF computer, in the visited communications network, which represents the first IMS contact point for the mobile radio terminal and hence for the mobile user.

The authentication according to 3GPP TS 33.203 V5.3.0 takes place between the mobile radio terminal and the S-CSCF computer with the participation of a so-called HSS computer (Home Subscriber Server Computer). Within the course of the authentication, the integrity key and the transfer key are generated in the mobile radio terminal and in the HSS computer and transmitted in a cryptographically secure manner to the S-CSCF computer.

The integrity key is transmitted, cryptographically secured, from the S-CSCF computer to the P-CSCF computer. The integrity protection and the authenticity of the subsequent IMS related signaling messages is provided locally between the mobile radio terminal and the P-CSCF computer and is based on the integrity key. According to UMTS Release 5, the transfer key is not used at the moment, but there are plans to include the transfer key in future versions of the UMTS Standard (Release 6 and subsequent standards) in order to provide additional protection for the confidentiality of transmitted data.

A problem arises if the transfer key and the integrity key, which are created as session keys from an IMS AKA authentication and key generation, are used to secure different applications than for IMS signaling.

The mobile radio terminal and the home communications network, in other words, the user and the home communications network operator are regarded as mutually trustworthy.

However, the visited communication network (in the case of roaming; where it is not a case of roaming, this corresponds to the home communications network) is given the integrity key and the transfer key. If an application server computer were also to be given the integrity key and the transfer key, then, theoretically, the application server computer would be able to compromise the security of the IMS signaling between the mobile radio terminal and the visited communications network.

Conversely, the visited communications network, i.e. a computer of the visited communications network would be able to compromise the security of the communication between the mobile radio terminal and the application server computer, if said security were to be based directly on the integrity key or the transfer key.

Where a mobile radio terminal wants to communicate with several application server computers at the same time, it is also desirable, and frequently even a requirement, that it is not possible to make inferences from the cryptographic key that has been given to a particular application server computer as to the cryptographic key that another application server computer has been given.

A possible method of solving the above described problem is to derive a new cryptographic key from the integrity key and/or the transfer key, and to do so both in the home communications network and in the mobile radio terminal of the user. An application server computer receives the derived cryptographic key, thus recognizes neither the integrity key nor the transfer key, provided that the cryptographic function used to derive the key does not allow any meaningful inferences to be made as to the integrity key and/or the transfer key for the application server computer.

The problem that arises with this method is that one needs a key derivation function that cannot be reconstructed by the computer of the visited communications network. A so-called keyed hash, which uses, for example, the integrity key or the transfer key as input parameter and the random parameter generated within the course of the authentication carried out in accordance with 3GPP TS 33.203 V5.3.0 as random value, can also be calculated by the computer in the visited communications network.

A new random parameter that was agreed between the mobile radio terminal of the user and the home communications network for the purposes of key derivation could only be achieved by making a modification to existing communications or security protocols, i.e. by a modification, for example, to the IMS AKA protocol or in the communication between the SCSCF computer and the HSS computer.

However, such a modification should be avoided, there is no simple way to modify existing communications standards or security standards and it is thus very cost intensive.

For an overview of the security mechanisms provided in the UMTS Standard Release 5, see G. Horn, D. Kroselberg, K. Muller: Security for IP multimedia services in the 3GPP third generation mobile system, Proceedings of the Third International Networking Conference INC' 2002, Pages 503 to 512, Plymouth, UK, 16.-18. Jul. 2002.

The message authentication functions and key generation functions used as part of the IMS AKA protocol are described in 3GPP TS 35.205 V5.0.0—Technical Specification, 3rd Generation Partnership Project, Technical Specification Group Services and System Aspects, 3G Security, Specification of the MILENAGE Algorithm Set: An example algorithm set for the 3GPP authentication and key generation functions f1, f1*, f2, f3, f4, f5 and f5*, Document 1: General (Release 5) and 3GPP TS 35.206 V5.0.0—Technical Specification, 3rd Generation Partnership Project, Technical Specification Group Services and System Aspects, 3G Security, Specification of the MILENAGE Algorithm Set: An example algorithm set for the 3GPP authentication and key generation functions f1, f1*, f2, f3, f4, f5 and f5*, Document 2: Algorithm Specification (Release 5). Further, a block cipher encryption function, known as Rijndael function, is described in 3GPP TS 35.206 V5.0.0.

For an overview of the security mechanisms provided in the UMTS Standard Release 5, see G. Horn, D. Kroselberg, K. Müller.

The message authentication functions and key generation functions used as part of the IMS AKA protocol are described in 3GPP TS 35.205 V5.0.0 and 3GPP TS 35.206 V5.0.0. Further, a block cipher encryption function, known as Rijndael function, is described in 3GPP TS 35.206 V5.0.0.

For an overview of various key derivation functions see IST-2000-25350—SHAMAN, D13—WP1 contribution, Final technical report comprising the complete technical results, specification and conclusion, Chapter 4.7, Pages 114 to 122, November 2002

A further key derivation method is described in D. Harkins und D. Carrel, The Internet Key Exchange (IKE), RFC 2409, Pages 17 to 19, November 1998.

A radio communication device and a method for radio communication is known from the EP 1 156 694 A1, which enable a mobile device to provide an encryption function and also an integration function on the data transmission levels two or higher. To this end the mobile terminal has an encryption or integrity unit, which is switched between a radio communication control unit and a terminal multiplexer. Thereby, the encryption integrity processing unit only carries out an encryption processing action on so-called transparent data, such as, for example, speech data transmitted between the terminal multiplexer and the radio communication unit. Further, the encryption integrity processing unit carries out encryption and/or integrity processing on non-transparent data transmitted to and from the radio communication control device.

The problem of how to increase the cryptographic security in a mobile radio system forms the basis of the invention.

The problem is solved by the method for creating and distributing cryptographic keys in a mobile radio system and by the mobile radio system with features in accordance with the independent patent claims.

A method for creating and distributing cryptographic keys in a mobile radio system assumes at least one mobile radio system with one mobile radio terminal, one first computer, preferably a computer of a visited communications network (Visited Network), one computer of a home communications network (Home Network) and also at least one second computer, preferably set up as an application server computer. The at least one mobile radio terminal is placed preferably in the area of the visited communications network and has been authenticated vis-à-vis the home communications network and the visited communications network. In relation to this, one should note that the visited communications network and the home communications network can be identical. As part of the authentication process, authentication key materials were created, which materials are stored and available in the mobile radio terminal and in the computer of the home communications network. In the method, a first cryptographic key and a second cryptographic key are created by the mobile radio terminal and by the computer of the home communications network by using the authentication key materials. Thus the first key and the second key are each stored and available in the mobile radio terminal and in the computer of the home communications network.

Alternatively, the first and the second computers can both be set up as application server computers.

The first cryptographic key is transmitted, preferably by the computer of the home communications network (alternatively by the mobile radio terminal), to the first computer, preferably to the computer of the visited communications network. Further, the second cryptographic key is transmitted to the second computer, preferably to the application server computer, preferably by the computer of the home communications network, alternatively by the mobile radio terminal.

A mobile radio system has at least one mobile radio terminal, in which authentication key materials are stored. This being the result of an authentication between the mobile radio terminal and a computer of a home communications network of the mobile radio terminal. Further the mobile radio system has a first computer, preferably a computer of a visited communications network and also a computer of the home communications network. There are authentication key materials stored in the computer of the home communications network, likewise resulting from the authentication of the mobile radio terminal at the communications network. Furthermore, there is at least one second computer, preferably set up as an application server computer, in the mobile radio system. The mobile radio terminal is situated in the visited communications network. The mobile radio terminal and the computer of the home communications network each have a crypto unit to create respectively a first cryptographic key and a second cryptographic key using the authentication key materials. The computer of the visited communications network has, in addition, a memory for storing the first cryptographic key, which key has been transmitted to the computer by the mobile radio terminal or by the computer of the home communications network. In addition, the application server computer has a memory for storing the second cryptographic key, which key has been transmitted to the application server computer by the mobile radio terminal or by the computer of the home communications network.

SUMMARY OF THE INVENTION

The invention discloses that authentication key materials created within the course of the authentication process are not transmitted directly and fully to the application server computer and the computer of the visited communications network, but that session keys are derived from at least one part of the authentication key materials, which keys are used in later communication between the mobile radio terminal and the application server computers or the computer of the visited communications network, for example for the encryption of data to be secured. In this way cryptographic security is secured in the communication between the mobile radio terminal and the respective application server computer against an attack on the part of the computer in the visited communications network and, in addition, the communication between the mobile radio terminal and the computer of the visited communications network is secured against attacks on the part of the application server computer, as the application server computer and the computer of the visited communications network each have keys that are not capable of making inferences as to the respective other key and hence not capable of decoding the data encoded using the key of the other instance.

According to one embodiment of the invention, the increased cryptographic security is achieved without having to modify the communications protocol standardized in UMTS.

The following embodiments of the invention relate both to the method for creating and distributing cryptographic keys in a mobile radio system and to the mobile radio system.

According to one embodiment of the invention, the first cryptographic key and the second cryptographic key are created using a key derivation function.

According to one embodiment of the invention, the first cryptographic key and the second cryptographic key are created such that it is not possible to make any inference from the first cryptographic key as to the second cryptographic key, it is not possible to make any inference from the second cryptographic key as to the first cryptographic key and it is not possible to make any inference from the first cryptographic key or the second cryptographic key as to the authentication key materials.

The authentication key materials can have at least two cryptographic keys, for example, for the case that the mobile radio system is one based on a 3GPP standard, which preferably has an IP based multimedia subsystem, that is an integrity key and a transfer key.

In this case it is to be preferred if the first cryptographic key and the second cryptographic key are derived from the transfer key.

In other words, this means that, according to this embodiment of the invention, further cryptographic keys are derived from the transfer key in the mobile radio terminal and in the computer of the home communications network.

As opposed to the integrity key, which, in accordance with 3GPP TS 33.203 V5.3.0, in order to secure the integrity of the IMS signaling, the home communications network transmits directly to the computer of the visited communications network, preferably to a P-CSCF computer, the transfer key itself is, according to the invention, not transmitted by the computer of the home communications network, preferably by the S-CSCF computer. As opposed to that, the transmission key is used to derive one or several new keys by applying an appropriate key derivation function, whereby the derivation function is based preferably on a pseudo random function. The S-CSCF computer uses the key derivation function to transmit the first derived key created as first cryptographic key to the P-CSCF computer, if the first cryptographic key is needed to protect the confidentiality of transmitted data.

In principle, there can be any desired number of communications networks and mobile radio terminals in the mobile radio system as well as any desired number of application server computers.

When there are several application server computers, in accordance with an embodiment of the invention, an additional cryptographic key is created by the mobile radio terminal and by the computer of the home communications network for each additional application server computer respectively using the authentication key materials. The respective additional cryptographic key is transmitted to the associated application server computer, preferably by the computer of the home communications network.

In this case, it is of advantage to generate the plurality or multiplicity of cryptographic keys by means of the same key derivation function, but using suitable different input parameters. By using suitable input parameters, preferably of a qualitatively high value random number, it ensures that for the key derivation function the recipient of the derived key, for example, an application server computer or the computer of the visited communications network cannot make any inferences as to the basic key, i.e. the transmission key, generally to the authentication key materials.

Such input parameters can be known parameters to the mobile radio terminal and also to the computer of the home communications network, such as, for example, the parameters that are produced from the respective current authentication in accordance with the IMS AKA protocol. Using the second cryptographic key another key is derived from the transfer key in order to protect further messages over and above the IMS signaling, for example, for the protection of HTTP messages, which signaling is provided between the mobile radio terminal and an application server computer designed as a presence server computer or to protect messages formed in accordance with the MIKEY protocol between the mobile radio terminal and a multicast service centre computer.

According to another embodiment of the invention, if necessary any desired number of further cryptographic keys are derived from the transmission key, generally from the authentication key materials.

In principle, any suitable cryptographic method for deriving a cryptographic key can be used as a key derivation method, for example, the methods described in IST-2000-25230, or alternatively, a variation of the key derivation method according to MILENAGE described in 3GPP TS 35.205 V5.0.0 and 3GPP TS 35.206 V5.0.0.

If the same key derivation function is used to create a large number of cryptographic keys as session keys, then only one cryptographic key derivation function needs to be implemented both in the mobile radio terminal and in the computer of the home communications network.

A further advantage of the invention is to be found in that a mobile radio terminal user only has to be authenticated once to access the IMS and the electronic services offered through the IMS. No further authentication is required to access the IMS based applications or services.

In addition, according to an embodiment of the invention, this avoids changes to existing standardized protocols, for example, there is no need to change the authentication protocol IMS AKA described in 3GPP TS 35.203 V5.0.0 or the protocol for communication between the S-CSCF computer and the HSS computer, as no additional parameters have to be exchanged between the computers respectively involved.

By using the transfer key (and not the integrity key) as the basic key for the key derivation, one also avoids differences arising when the key is used between various versions of the standard (UMTS-3GPP Release 5 and UMTS-3GPP Release 6, etc.), which differences would result in greater input in standardization and integration.

Further, according to an embodiment of the invention, the possibility is given to design the key derivation in such a way that the key can only be used for the security relations between the mobile radio terminal and a certain network unit and not for other security connections and does not allow any inferences to be made as to other security relations, in particular it does not allow the cryptographic keys used in other security relations to be determined.

Further, it is possible to design the key derivation in such a way that the mobile radio terminal and the S-CSCF computer calculate the derived key just from the transfer key, from parameters resulting from the respective current authentication according to the IMS AKA communications protocol, and from the identity of the application server computer.

This has the added advantage that the derived key can be calculated for a certain application server computer independent of the keys for other application server computers. This is of significant importance, especially where the need to calculate derived cryptographic keys for application server computers does not arise at the same time as the user contacts different application server computers at different times and some not at all.

According to another embodiment of the invention, at least one of the previously created cryptographic keys is used as additional parameter for the key derivation function. In other words, this means that one or several previously created and hence available cryptographic keys are used as input values for the key derivation function, and thus serve to create subsequent cryptographic keys.

Thus the invention provides a solution to the problem of how, on the basis of an existing IMS security infrastructure in a mobile radio system, to protect an additional communication between the mobile radio terminal and the application server computers for IMS based applications or services, which communication is not covered by the previous security of the IMS mobile radio system.

Such a communication can, for example, be based on the HTTP protocol and the MIKEY protocol, generally on any communications protocol of the OSI Level 7, i.e. the application level.

The mechanism described generates session keys to secure communication, which keys are derived from the integrity key and/or transmission key created within the course of an IMS authentication in accordance with 3GPP TS 35.203 V5.0.0. In particular, a solution is provided for the problem that various network instances, such as application server computer and P-CSCF computer are given different keys, which keys do not permit any inferences to be made as to other cryptographic keys, so that even a network instance, i.e. a computer of a visited communications network, cannot damage the confidentiality of the messages that the user exchanges with another network instance, i.e. with a different computer of a communications network.

In addition, according to the invention, a mechanism is used which allows cryptographic keys, independent of each other, to be generated for different applications and to do so using only one key derivation function. Thus input involved in implementing several such key derivation functions is avoided.

In addition, as described above, the user, i.e. the mobile radio terminal, avoids having to go through repeated authentications.

Thus the invention can be seen to be that further cryptographic keys can be derived from the transfer key generated during the IMS registration, which cryptographic keys are used for encryption between messages between the mobile radio terminal and the P-CSCF computer as well as for security relations between the mobile radio terminal and the application server computers, and can be done so in such a way as to achieve the above described advantages.

BRIEF DESCRIPTION OF THE DRAWINGS

Exemplary embodiments of the invention are depicted in the figures and are described in more detail below.

DETAILED DESCRIPTION OF THE INVENTION

Although, to make the representation simpler, only one mobile radio terminal, one home communications network and one visited communications network is depicted in the following exemplary embodiment, the invention can be applied to any number of mobile radio terminals and communications networks.

Figure 1:
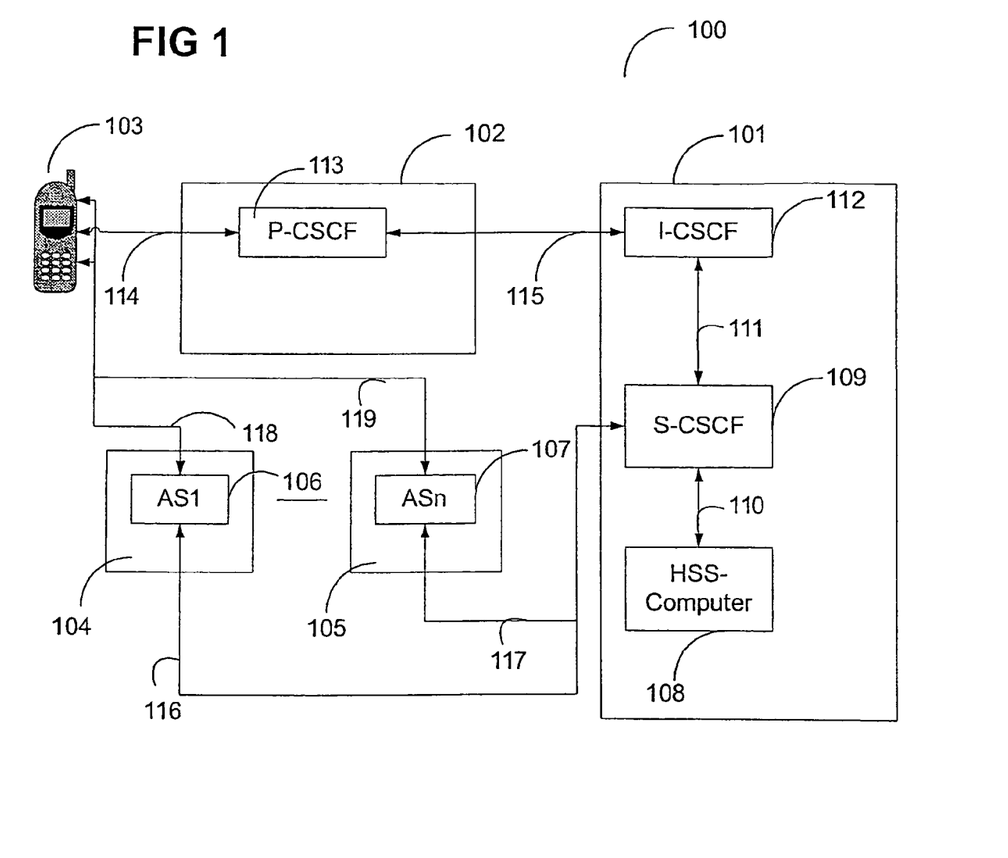
FIG. 1 shows a block diagram of a mobile radio system according to an exemplary embodiment of the invention.

The mobile radio system 100 depicted in FIG. 1 is set up in accordance with UMTS Standard Release 5.

The mobile radio system 100 in accordance with the preferred exemplary embodiment has a home communications network 101 (Home Network), a visited communications network 102 (Visited Network), a mobile radio terminal 103, as well as application server computers 106, 107, located in further communications networks 104, 105.

In the following, only those elements of the mobile radio system 100 according to the UMTS Standard Release 5 relevant to the invention are briefly explained.

There is a Home Subscriber Server computer (HSS computer) 108 in the home communications network 101. In the HSS computer, defining data, for example, a user service profile, is stored for each mobile radio set 103 assigned to the home network 101 and for the owner of the mobile radio terminal 103.

A Serving Call State Control function computer (S-CSCF computer) 109 is linked to the HSS computer 108 by means of a first communications line 110.

The entire call management, both packet switched and line switched, is controlled by a CSCF computer. Some further tasks of the CSCF computer include managing accounts (billing), address management and provision of trigger mechanisms to trigger special preset services and nodes.

An interrogating CSCF computer (I-CSCF computer) 112 is linked to the S-CSCF computer 109 by means of a second communications link 111. The IP address of the respective responsible HSS computer 108 is stored in the I-CSCF computer 112, which is located in the home communications network 101, so that at the start of the authentication of a mobile radio terminal 103 at the home communications network 101, it is possible to establish the responsible HSS computer 108 for the authentication. The I-CSCF computer 112 clearly creates the "communications interface" of the visited communications network 102 to the home communications network 101.

There is a proxy CSCF computer (P-CSCF computer) 113 in the visited communications network 102, which computer, together with the correspondingly available base station in the visited communications network 102, provides an air interface for creating a radio link 114 to the mobile radio terminal 103, which is located in the area to which the P-CSCF computer 113 is assigned.

The P-CSCF computer 113 is connected via a radio link or a fixed network communications link 115 via any desired number of other communications networks with the I-CSCF computer 112 of the home communications network 101.

Furthermore, the application server computers 106, 107 in the further communications networks 104, 105 are linked with the S-CSCF computer 109 of the home communications network 101, in accordance with this embodiment by means of further radio links or fixed network communications link 116, 117. The application server computer 106, 107 is linked with the mobile radio terminal 103 by means of additional radio links or fixed network communications link 118, 119.

In accordance with this embodiment, each individual computer has a microprocessor, one or several memories and several corresponding communications interfaces, thus enabling the exchange of electronic messages between the individual computers and the mobile radio terminal 103.

In addition, the computer and the mobile radio terminal 103 are set up in such a way that the process steps described below can be carried out and the electronic messages described below can be created, encoded or decoded and sent or received.

According to this exemplary embodiment, the Session Initiation Protocol (SIP) is used, at least in part, to create the electronic messages.

To allow a mobile radio terminal 103 to use a service offered by an application server computer 106, 107, there must be a mutual authentication between the mobile radio terminal 103 and the home communications network 101 and this must be successfully concluded.

Figure 2:
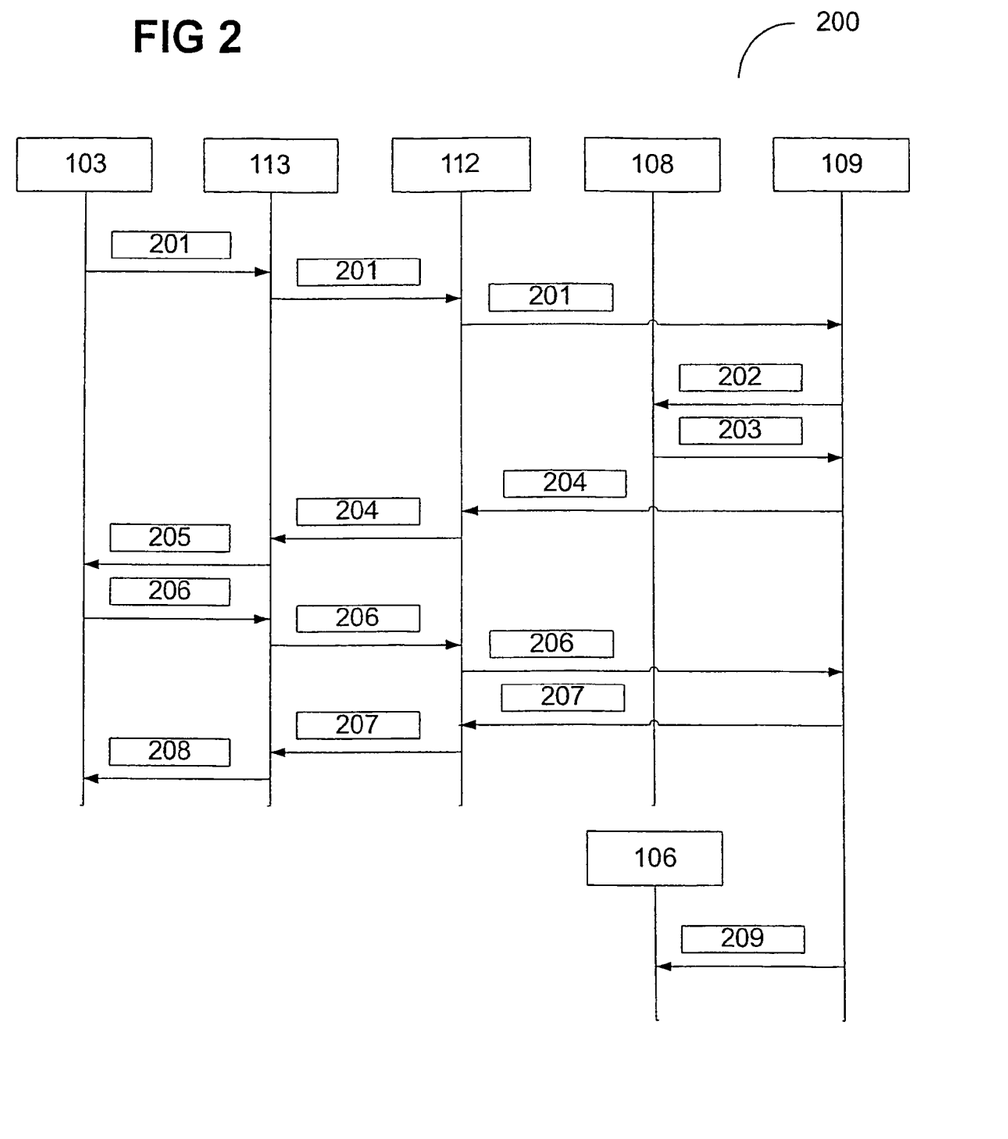
FIG. 2 shows a message flow chart depicting the message flow of the creation and distribution of cryptographic keys according to an exemplary embodiment of the invention.

At the start of the procedure for authentication and for creating and distributing cryptographic keys, which keys are used in signaling and in exchanging encrypted electronic messages, a SIP registration message 201 is sent to the P-CSCF computer 113 by the mobile radio terminal 103, as depicted in the message flow chart 200 in FIG. 2. After the SIP registration message 201 has been received by the P-CSCF computer 113, it is forwarded to the I-CSCF computer 112 in the home communications network 101 of the mobile radio terminal 103 sending the SIP registration message 201. The I-CSCF computer 112 also forwards the SIP registration message 201 and does so to the associated S-CSCF computer 109 of the home communication network 101.

After the SIP registration message 201 has been received, the S-CSCF computer 109 checks whether the mobile radio terminal 103 sending the SIP registration message 201 is already registered in the S-CSCF computer 109 or not. If this is not the case, then the S-CSCF computer 109 sends a Cx-authentication data request message 202 to the HSS computer 108 via the first communication link 110. The S-CSCF computer 109 uses said Cx-authentication data request message to request new authentication data for the mobile radio terminal 103 from the HSS computer 108.

The HSS computer 108 reacts to the Cx-authentication data request message 202 by generating one or several records of authentication data in the manner described below and by transmitting these in an authentication data message 203 to the S-CSCF computer 109.

In an alternative embodiment, the S-CSCF computer 109 generates the authentication data itself.

Figure 3:
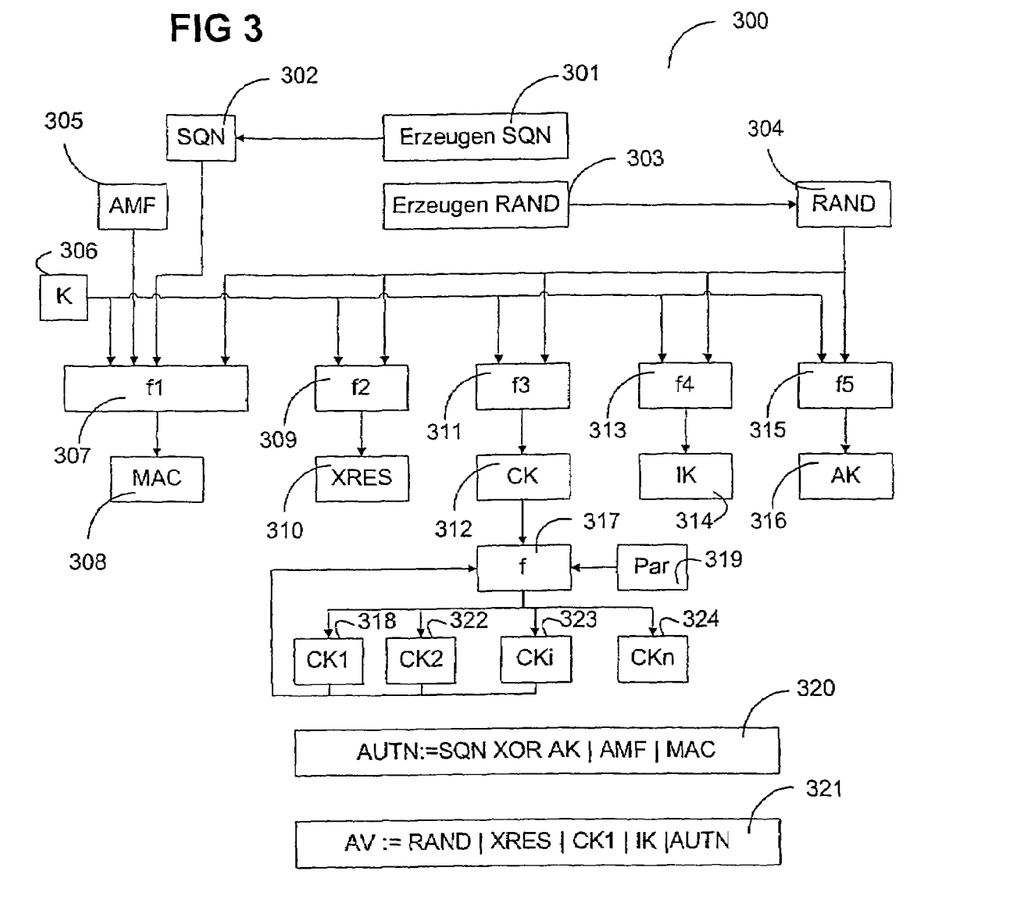
FIG. 3 shows a block diagram depicting the creation of cryptographic keys according to an embodiment of the invention.

The HSS computer 108, alternatively a computer of an authentication centre computer assigned to the HSS computer 108, generates a consecutive sequence number SQN 302 (step 301).

Further, in an additional step (step 303) a random number RAND 304 is created.

Further, a preset, so-called authentication management field AMF 305 is used as input parameter for the operations described below.

Further, a secret key K 306 known only to the HSS computer 108 (in the alternative embodiment known only to the S-CSCF computer 109) and to the mobile radio terminal 103, is used in the operations described below.

In this context, it should be noted that an authentication vector AV described below, can also be created in the S-CSCF computer 109 or in a comparable network element in the home communications network 101, in which case, the above described values are available in the respective computer unit.

Using the secret key K 306, the authentication management field AMF 305, the sequence number SQN 302 and the random number RAND 304, a message authentication code MAC 308 is formed using a first message authentication function f1 307, as described, for example, in 3GPP TS 35.205 V5.0.0 and 3GPP TS 35.206 V5.0.0. The MAC 308 is formed using the following rule:

$$MAC = f1_K(SQN|RAND|AMF). \qquad (1)$$

In this description, the symbol "|" symbolizes a concatenation of the values to the left or right of the symbol.

The message authentication functions f1 and f2 used below and the key generation functions f3, f4, f5 are described in 3GPP TS 35.205 V5.0.0 and 3GPP TS 35.206 V5.0.0.

An expected response value XRES 310 is created by means of a second message authentication function f2 309 and using the secret key K 306 and the random number RAND 304:

$$XRES = f2_K(RAND). \qquad (2)$$

A transfer key CK 312 is created by means of a first key generation function f3 311 and using the secret key K 306 and the random number RAND 304 according to the following rule:

$$CK = f3_K(RAND). \qquad (3)$$

Further an integrity key IK 314 is created using a second key generation function f4 313 and using the secret key K 306 and the random number RAND 304, according to the following rule:

$$IK = f4_K(RAND). \qquad (4)$$

An anonymity key AK 316 is calculated by means of a third key generation function f5 315, and also using the secret key K 306 and the random number RAND 304, according to the following rule:

$$AK = f5_K(RAND). \qquad (5)$$

Further an authentication token AUTN 320 is created by the HSS computer according to the following rule:

$$AUTN = SQN + AK|AMF|MAC \qquad (6)$$

The above described calculated values, i.e. the authentication token AUTN, the expected response value XRES 310, the transfer key CK 312 and the integrity key IK 314, are transmitted to the S-CSCF computer 109.

According to the invention, using a key derivation function f 317, a first derived key CK1 319 is created in the following way from the transfer key CK 312 in the S-CSCF computer 109 using input parameter 318 described later.

According to a first embodiment of the invention, a pseudo random function PRF is used as key derivation function f 317, which PFR is based, for example, on the HMAC-SHA1 method? The key derivation function f 317 is essentially developed in accordance with the key derivation method specified in D. Harkins and D. Carrel under Section 5.5. Thus the first derived key CK1 is created according to the following rule:

$$CK1 = f_K(CK|Par1|random), \qquad (7)$$

Whereby the input parameter Par1 is optional and whereby random is suitable random material, created, for example, according to the following rule:

$$random = RAND|AUTN|XRES, \qquad (8)$$

whereby in the course of the authentication procedure in accordance with 3GPP TS 35.203 V5.0.0 RAND|AUTN is transmitted to the mobile radio terminal 103 as an authentication request message 204 described below.

The mobile radio terminal 103 uses the response value RES, which it created itself, instead of the expected response values XRES, in order to create the random value "random". In the course of the procedure according to 3GPP TS 35.203 V5.0.0 and described below, the mobile radio terminal 103 transmits a value derived from the value RES to the S-CSCF computer 109 as authentication response.

In this context, it should be noted that the derived cryptographic key can be created in the S-CSCF computer 109 or in a comparable, suitable network element in the home communications network 101.

Further the requested authentication vector AV 321 of the S-CSCF computer 109 is created by the S-CSCF computer 109 according to the following rule:

$$AV = RAND|XRES|CK1|IK|AUTN. \qquad (9)$$

The S-CSCF computer 109 transmits the SIP authentication request message 204 to the I-CSCF computer 112, the computer forwards said SIP authentication request message 204 to the P-CSCF computer 113 of the visited communications network 102. The SIP authentication request message 204 includes the random number RAND 306, the authentication token 320 and the integrity key IK. As opposed to the authentication procedure under 3GPP TS 35.203 V5.0.0, the transmission key CK is, according to the invention, not included therein and thus is also not transmitted to the P-CSCF computer in the visited communications network to a user. The SIP authentication request message 204 includes the first derived key CK1 instead.

Likewise, the above described values are created in the mobile radio terminal 103 using the message authentication functions f1 and f2 and the key generation functions f3, f4 and f5 and are used to authenticate the visited communications network 102. For this purpose, the functions f1, f2, f3, f4 and f5 are also implemented in the mobile radio terminal 103.

Further, the mobile radio terminal 103 has, of course, the secret key K and the random number RAND 306. In addition, the additional data described below on the parameters Par1 for building the derived key using the key derivation function 317 is also available in the mobile radio terminal 103.

Before forwarding the authentication request message 204 the P-CSCF computer 113 stores the integrity key IK 314 and the first derived key CK1, removes these from the authentication request message 204 and transmits a reduced authentication request message 205 to the mobile radio terminal 103.

This means the integrity key IK 314 is available in the P-CSCF computer 113, but not in the mobile radio terminal 103. Using the [lacuna] in the mobile radio terminal 103, the anonymity key AK 316 was created by using the secret key K 306 and the random number RAND 304 available in the mobile radio terminal 103 by using the fifth and the third key generation function f5 315.

Using the first field of the authentication tokens 320, an EXKLUSIVE-OR link is created with the anonymity key AK 316 while creating the contents of the first field (SQN+AK) and as a result the mobile radio terminal 103 is given the sequence number SQN 302.

A terminal message authentication code is created using the sequence number, the authentication management field AMF 305 included in the authentication token 320, the random number RAND 304, the secret key K 306 and the first message authentication function f1 307. The terminal message authentication code is compared with the message authentication code MAC 308 contained in the authentication token 320.

If these two values correspond, then the home communications network 102 has been successfully authenticated vis-à-vis the mobile radio terminal 103 and the mobile radio terminal 103 calculates a response value RES using the random number RAND 304, the secret key K 306 and the second message authentication function f2 309 and sends a response value derived from RES in a SIP authentication response message 206 to the P-CSCF computer 113, as described in 3GPP TS 35.203 V5.0.0.

It is to be noted that the mobile radio terminal 103 also calculates the transfer key 312 using the first key generation function f3 311 and the secret key K 306 as well as calculating the integrity key IK 314 using the second key generation function f4 313 and the secret key K 306. The authentication response message 206 is forwarded by the P-CSCF computer 113 to the I-CSCF computer 112 and by the latter to the S-CSCF computer 109.

The S-CSCF computer 109 or HSS computer 108 check the response value derived from RES, by comparing it with the value derived analogously from the expected response XRES. If the two values correspond, the mobile radio terminal 103 has been successfully authenticated vis-à-vis the S-CSCF computer 109.

Now the value random can also be created in the mobile radio terminal 103 in accordance with rule (8) and subsequently the first derived key CK1 in accordance with rule (7).

An authentication confirmation message 207, is transmitted by the S-CSCF computer 109 to the I-CSCF computer 112, which then forwards said message to the P-CSCF computer 113.

The authentication confirmation message 208 is transmitted to the mobile radio terminal 103 to confirm successful mutual authentication.

Further, the S-CSCF computer 109 uses the key derivation function f 317 again and optionally using an additional input parameter Par2 to create a second derived key CK2 322 according to the following rule:

$$CK2 = f_K(CK, CK1|Par2|random). \quad (10)$$

The second derived key CK2 322 is transmitted in a key message 209 to the application server computer 106, which uses the second derived key CK2 322 for the future encryption.

The second derived key CK2 322 is likewise created in the mobile radio terminal 103 as in the S-CSCF computer 109.

If additional key material, i.e. additional derived keys are needed for communication with additional application server computers, then additional derived keys CKi (i=1, . . . n, n refers to the number of derived keys formed) 323, 324, in principle, any number desired of additionally derived keys are created according to the following rule and transmitted to the respective application server computer:

$$CKi = f_K(CK, CKi|Pari|random). \quad (11)$$

In this case, Pari (i=1, . . . , n) can represent the identity, for example, the IP address, of the respective application server computer 106, 107.

In addition, the respective parameter Pari can contain further information about the use of the key, for example, information about the use for encryption or for integrity protection, information about the direction of the message flow (from the mobile radio terminal 103 or to the mobile radio terminal 103), for which the key is to be used.

After the integrity key IK 314 and the transfer key CK 312 become available in the mobile radio terminal 103 and in the S-CSCF computer 109, the key derivation function f 317 is executed as often as need be until the required cryptographic keys are present for all applications that must be secured. As described above, this takes place both in the mobile radio terminal 103 and in the S-CSCF computer 109.

Subsequently the P-CSCF computer 113, for example, makes available or makes appropriate use of the derived keys (first derived key CK1 318) for the protection of the IMS messages themselves and makes available or makes appropriate use of the further derived keys 322, 323, 324, for the respective application to be secured.

Alternatively, a key sequence can be generated by concatenation of the individually generated derived keys CK1, CK2, CKi, CKn 318, 322, 323, 324. This is of advantage if the derived keys do not correspond with respect to their length to the requirements of the security method used or if, for example, two unidirectional keys are required for an application.

In this case, a derived key is produced in accordance with the following rule:

$$KEYMAT = CK1|CK2| \ldots |CKi| \ldots \quad (12)$$

The cryptographic keys required for the different applications is then taken from this key sequence KEYMAT, starting from the left and following sequentially.

Alternative exemplary embodiments for creating the derived keys 318, 322, 323, 324 are specified below.

The following exemplary embodiment is similar to the MILENAGE method described in 3GPP TS 35.205 V5.0.0 and 3GPP TS 35.206 V5.0.0.

Assuming that "random" suitable random material, to be created, for example, in accordance with rule (8). To create the random value "random", the method according to the above described embodiment is applied. Further it is assumed that Asi ID denotes the identity, for example, the IP address, of the application server computer ASi for i=1, 2, . . . , n. Assuming h to be a hash function, such as, for example, SHA-1. E denotes a suitable block cipher encryption function with input values, output values and keys each of 128 bit length. If the input value is x, the key k and the output value y, then the output value is determined as y according to the following rule:

$$y = E[x]_k. \quad (13)$$

An example of a suitable block cipher encryption function is the so-called Rijndael method, as described, for example in 3GPP TS 35.206 V5.0.0.

A 128 bit value $x_i$ is derived from the application server computer identity and the transfer key CK 312 according to the following rule:

$$x_i = ASi\text{-}ID + E[ASi\text{-}ID]_{CK}. \quad (14)$$

An intermediate value TEMP of the length 128 bits is calculated according to the following rule:

$$TEMP = E[random + x_i]CK. \quad (15)$$

Any derived key CKi is now calculated as follows:

$$CKi(r,c) = E[rot(TEMP + x_i, r) + c]_{CK} + X_i, \quad (16)$$

whereby r and c are suitable presettable constants, as described, for example, in 3GPP TS 35.206 V5.0.0.

As likewise described in 3GPP TS 35.206 V5.0.0, according to the invention it is possible to derive further keys CKi (r,c) for the same application server computer by appropriate selection of further constants r and c.

According to an alternative exemplary embodiment of the invention, which follows the key derivation method according to RSA PKCS#5, the random value "random" is again used, which value is determined in the same way as described in the first embodiment.

Again, according to the second exemplary embodiment, it is assumed that ASi ID is the identity of the application server computer ASi for i=1, 2, . . . , n. Again, h is assumed to be a hash function such as, for example SHA1 and PRF denotes a pseudo random function.

The following values are calculated:

$$X_0 = h(\text{"encryption key for P-CSCF computer"}), \quad (17)$$

$$x_i = h(ASi\text{-}ID). \text{ for } i = 1, \ldots, n \quad (18)$$

Subsequently the derived keys CKi are calculated according to the following rule for i=0, 1, 2, . . . , n:

$$CKi = F(CK, \text{random}, c, i) = U_1(i) \backslash XOR\ U_2(i) \backslash XOR \ldots \backslash\\ XOR\ U_c(i) \quad (19)$$

Whereby c is a suitable, suitably presettable whole number and $$U_1(i) = PRF(CK, \text{random}|x_i) \quad (20)$$

$$U_2(i) = PRF(CK, U_1(i)) \quad (21)$$

$$U_c(i) = PRF(CK, U_{c-1}(i)). \quad (22)$$

According to another alternative embodiment, the methods according to the first exemplary embodiment and the second exemplary embodiment are combined in the following sense.

First of all, a derived key CKi is calculated for the application server computer ASi, as described in the second embodiment. Then the method according to the first exemplary embodiment is applied to obtain further key material for the application server computer Asi, i.e. the transfer key CK 312 in the first embodiment is replaced by the respectively derived key CKi that was obtained from the method according to the second embodiment.

Then for the additionally derived keys we get:

$$CKi1 = f(CKi|\text{random}) \quad (23)$$

$$CKi2 = f(CKi, CKi1|\text{random}) \quad (24)$$

$$CKi3 = f(CKi, CKi2|\text{random}) \quad (25)$$

etc.

From now on, keys for the encryption of the respective messages in the required applications are present both in the mobile radio terminal 103, in the P-CSCF computer 113 and in the application server computers 106, 107, without the P-CSCF computer 113 being able to make inferences as to the derived keys CKi 318, 322, 323, 324 in the application server computers 106, 107 and vice versa, without the application server computers 106, 107 being able to make inferences as to the key material stored and used in the P-CSCF computer 113.

In the following the useful data to be transmitted are encrypted by using the derived keys 318, 322, 323, 324.

The following publications are quoted in this document:

The invention claimed is:

1. A method for creating and distributing cryptographic keys in a mobile radio system, wherein the mobile radio system has at least one mobile radio terminal, a first computer, a computer of a home communications network and a second computer, the at least one mobile radio terminal and the computer of the home communications network including authentication key materials resulting from an authentication, the method comprising:
   creating a first cryptographic key and a second cryptographic key by the at least one mobile radio terminal and the computer of the home communications network using the authentication key materials, wherein the first cryptographic key and the second cryptographic key are created such that no inference can be made from the first cryptographic key as to the second cryptographic key,
      no inference can be made from the second cryptographic key as to the first cryptographic key, and
      no inference can be made from the first cryptographic key or from the second cryptographic key as to the authentication key materials;
   transmitting the first cryptographic key from one or both of the at least one mobile terminal and the computer of the home communications network to the first computer; and
   transmitting the second cryptographic key from one or both of the at least one mobile radio terminal and the computer of the home communications network to the second computer, wherein the first computer is a first application server computer and the second computer is a second application server computer.

2. The method according to claim 1, wherein the first computer is a computer of a visited communications network, and the at least one mobile radio terminal is situated in the visited communications network.

3. The method according to claim 1, wherein the first cryptographic key and the second cryptographic key are created using at least one key derivation function.

4. The method according to claim 1, wherein the authentication key materials have at least two cryptographic keys.

5. The method according to claim 1, wherein the mobile radio system is designed as a mobile radio system based on a 3GPP standard.

6. The method according to claim 5, wherein the mobile radio system has an IP multimedia subsystem.

7. The method according to claim 1, wherein the authentication key materials have an integrity key and a transfer key.

8. The method according to claim 7, wherein the first cryptographic key and the second cryptographic key are derived from the transfer key.

9. The method according to claim 1, wherein additional cryptographic keys are created by the at least one mobile radio terminal and by the computer of the home communications network for additional application server computers using the authentication key materials and are transmitted to respective application server computers.

10. The method according to claim 1, wherein a same key derivation function is used to create the first and second cryptographic keys.

11. The method according to claim 1, wherein different additional input parameters are used for a key derivation function to create the first cryptographic key and the second cryptographic key.

12. The method according to claim 11, wherein parameters created during authentication are used as additional input parameters for the key derivation function.

13. The method according to claim 12, wherein at least one of previously created first and second cryptographic keys are used as additional input parameters for the key derivation functions.

14. A mobile radio system, comprising:
- at least one mobile radio terminal situated in a visited communications network, in which authentication key material resulting from an authentication are stored;
- a first computer of the visited communications network, wherein the first computer is a first application server computer;
- a computer of a home communications network in which computer are stored the same authentication key materials, resulting form the authentication, as are stored in the at least one mobile radio terminal; and
- at least one second computer,
- wherein the at least one mobile radio terminal and the computer of the home communications network each have a crypto unit for creating a first cryptographic key and a second cryptographic key by using the authentication key materials,
- wherein one or both of the at least one mobile radio terminal and the computer of the home communications network comprise a transmitter which transmits the first cryptographic key to the first computer, and wherein one or both of the at least one mobile radio terminal and the computer of the home communications network comprise a transmitter which transmits the second cryptographic key to the second computer,
- wherein the first cryptographic key and the second cryptographic key are created such that
  - no inference can be made from the first cryptographic key as to the second cryptographic key,
  - no inference can be made from the second cryptographic key as to the first cryptographic key, and
  - no inference can be made from the first cryptographic key or from the second cryptographic key as to the authentication key materials;
- wherein the first computer of the visited communications network comprises memory for storing the first cryptographic key, and
- wherein the second computer is an application server computer comprising memory for storing the second cryptographic key.

* * * * *